(12) United States Patent
Bi et al.

(10) Patent No.: US 10,090,009 B2
(45) Date of Patent: Oct. 2, 2018

(54) VIBRATION COMPENSATION USING DISK LOCKED CLOCK ERROR

(71) Applicant: Seagate Technology LLC, Cupertino, CA (US)

(72) Inventors: Qiang Bi, Singapore (SG); GuoQing Zhang, Singapore (SG); Kian Keong Ooi, Singapore (SG); MingZhong Ding, Singapore (SG); WenJun Cao, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 106 days.

(21) Appl. No.: 15/247,382

(22) Filed: Aug. 25, 2016

(65) Prior Publication Data

US 2018/0061452 A1 Mar. 1, 2018

(51) Int. Cl.
*G11B 5/09* (2006.01)
*G11B 5/48* (2006.01)

(52) U.S. Cl.
CPC ..................................... *G11B 5/48* (2013.01)

(58) Field of Classification Search
None
See application file for complete search history.

(56) References Cited

U.S. PATENT DOCUMENTS

| | | | |
|---|---|---|---|
| 4,947,093 A | 8/1990 | Dunstan et al. | |
| 6,285,522 B1 | 9/2001 | McKenzie et al. | |
| 6,741,417 B2 | 5/2004 | Hsin et al. | |
| 6,909,574 B2* | 6/2005 | Aikawa | G11B 5/5582 360/77.04 |
| 7,333,280 B1* | 2/2008 | Lifchits | G11B 5/596 360/75 |
| 7,468,857 B2* | 12/2008 | Hutsell | G11B 5/5582 360/77.03 |
| 8,049,982 B1 | 11/2011 | Grundvig et al. | |
| 8,446,687 B2* | 5/2013 | Hironaka | G11B 5/5552 360/78.05 |
| 8,797,673 B2 | 8/2014 | Supino | |
| 8,953,278 B1* | 2/2015 | Zhou | G11B 5/59694 360/78.09 |
| 8,982,501 B1* | 3/2015 | Nicholls | G11B 19/28 360/75 |
| 9,058,827 B1* | 6/2015 | Tu | G11B 5/59694 |
| 9,111,575 B1 | 8/2015 | Zhou et al. | |
| 9,171,568 B1* | 10/2015 | Nicholls | G11B 19/28 |
| 9,202,496 B2* | 12/2015 | Supino | G11B 5/58 |
| 9,280,995 B2 | 3/2016 | Fan et al. | |
| 9,601,143 B1* | 3/2017 | Seo | |
| 2012/0019961 A1* | 1/2012 | Lee | G11B 5/5547 360/294.5 |
| 2017/0017216 A1* | 1/2017 | Xing | G05B 19/042 |

* cited by examiner

Primary Examiner — Peter Vincent Agustin
(74) Attorney, Agent, or Firm — Faegre Baker Daniels LLP

(57) ABSTRACT

An apparatus includes a disk locked clock system and a feedforward microactuator compensator. The disk locked clock system is configured to estimate a timing error and generate a timing error signal. The feedforward microactuator compensator is configured to generate a microactuator compensation signal, without use of a vibration sensor signal, in response to the timing error signal.

20 Claims, 5 Drawing Sheets

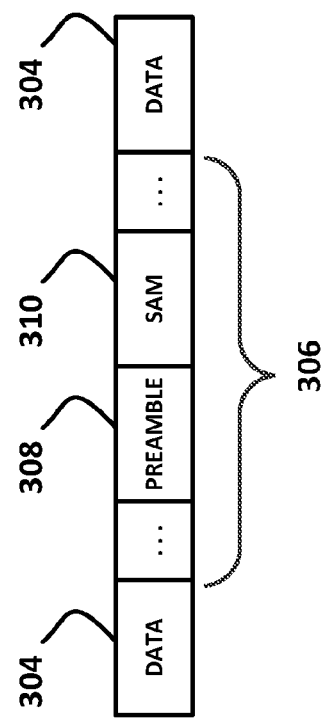
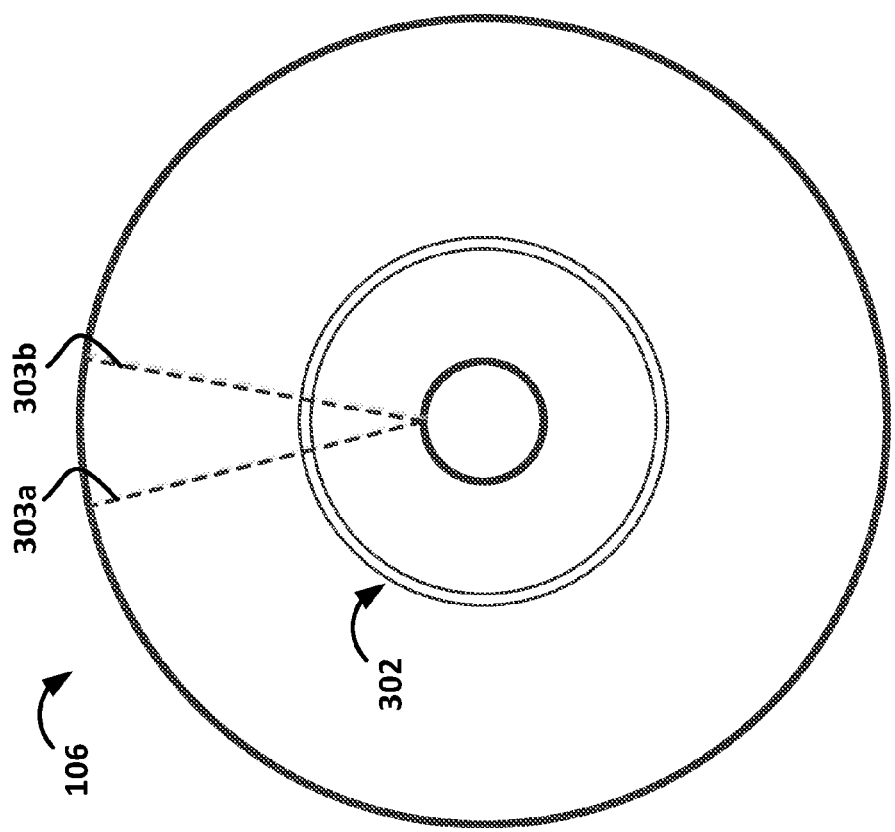

VIBRATION COMPENSATION USING DISK LOCKED CLOCK ERROR

SUMMARY

An apparatus includes a disk locked clock system and a feedforward microactuator compensator. The disk locked clock system is configured to estimate a timing error and generate a timing error signal. The feedforward microactuator compensator is configured to generate a microactuator compensation signal, without use of a vibration sensor signal, in response to the timing error signal.

An apparatus includes a disk locked clock system and a feedforward VCM compensator. The disk locked clock system is configured to estimate a timing error and generate a timing error signal. The feedforward VCM compensator is configured to generate a VCM compensation signal, without use of a vibration sensor signal, in response to the timing error signal.

An integrated circuit includes means for correcting for disturbances without use of a vibration sensor, means for controlling a position of a voice coil motor (VCM) assembly, via a VCM control loop, in response to the means for correcting; and means for controlling a position of a microactuator, via a microactuator control loop, in response to the means for correcting.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

FIG. 3A shows a schematic of a magnetic recording medium, in accordance with certain embodiments of the present disclosure.

FIG. 3B shows a schematic of a portion of a track of the magnetic recording medium in FIG. 3A.

Figure 1:
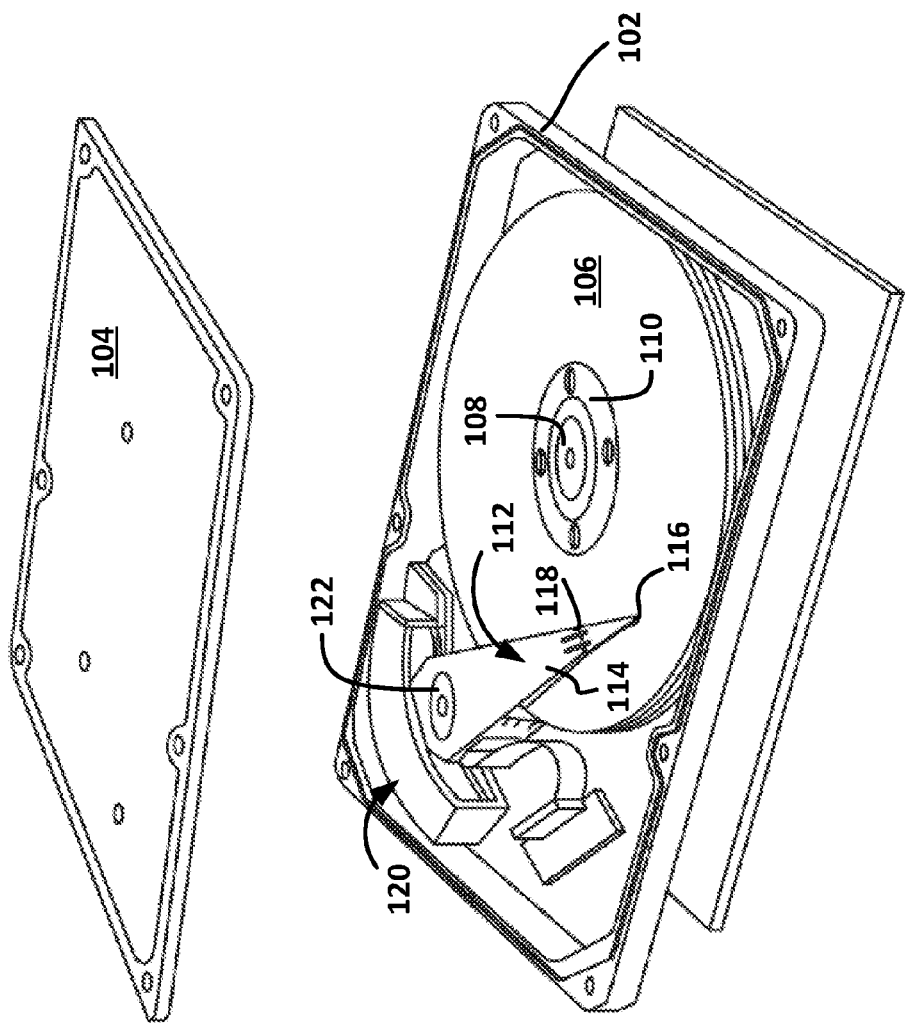
FIG. 1 shows an exploded, perspective view of a hard drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

Certain embodiments of the present disclosure are directed to servo control systems including multi-stage actuation systems, and more particularly, to disturbance compensation approaches for use in servo control systems.

Figure 2:
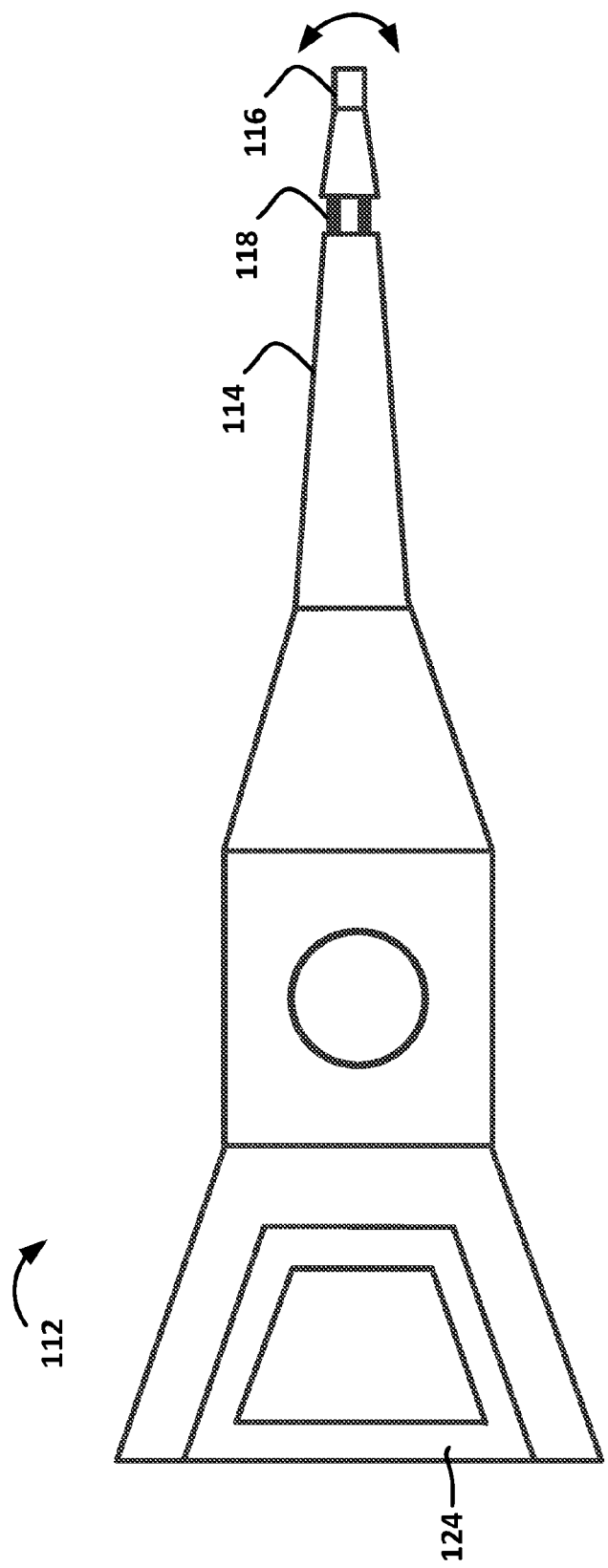
FIG. 2 shows a top view of an actuator assembly, in accordance with certain embodiments of the present disclosure.

FIG. 1 shows an exploded, perspective view of a hard drive 100 having a base deck 102 and top cover 104. The hard drive 100 includes magnetic recording disks 106 coupled to a spindle motor 108 by a disk clamp 110. The hard drive 100 also includes an actuator assembly 112 (shown in more detail in FIG. 2) coupled to a suspension 114 that positions read/write heads 116 over data tracks on the magnetic records disks 106. Each read/write head 116 can be coupled to a microactuator 118, which assists with positioning the read/write head 116 over a desired track on the magnetic recording disks 106. Each microactuator 118 can be positioned at least partially on or between the suspension 114 and one of the read/write heads 116. As appreciated by one skilled in the art, the read/write heads 116 may be coupled to the suspension 114 by a head-gimbal assembly (not shown). During operation, the spindle motor 108 rotates the magnetic recording discs 106 while the actuator assembly 112 is driven by a voice coil motor assembly 120 to pivot around a pivot bearing 122. The hard drive 100 further includes a servo control system—discussed in more detail below—that controls rotation of the actuator assembly 112 via the voice coil motor (VCM) assembly 120 and controls actuation of the microactuator 118 to position the read/write heads 116 over a desired track on the magnetic recording disks 106 for reading and writing operations. The actuator assembly 112 may be coupled to the pivot bearing 122 by an adhesive or a tolerance ring (not shown).

The voice coil motor assembly 120 (including a voice coil 124 shown in FIG. 2) and microactuator 118 are arranged to carry out various positioning operations (e.g., track seeking, track settling, track following) that position the read/write heads 116 over a desired track of the magnetic recording disks 106 to read data from or write data to a desired track. For example, in response to a command to read data from or write data to a track different from where a read/write head 116 is currently positioned (i.e., a track-seeking operation), a current may be applied to the voice coil 124 of the voice coil motor assembly 120 to rotate the actuator assembly 112 (and therefore the read/write head 116) towards the desired track. As the read/write head 116 nears the desired track, the microactuator 118 may be activated to assist the voice coil motor assembly 120 with settling over the desired track (i.e., a track-settling operation). For example, the microactuator 118 can include elements formed of lead-zirconate-titanate (PZT) and, as such, may extend (e.g., lengthen) in response to a positive applied voltage or contract (e.g., shorten) in response to a negative applied voltage. In certain configurations, when one of the PZT elements extends and the other PZT element shortens or maintains its length, the read/write head 116 will pivot (as denoted with arrows near the read/write head 116 in FIG. 2). Once the read/write head 116 is positioned over the desired track, the microactuator 118 may be used to compensate for small positioning errors (i.e., a track-follow operation). It is appreciated that the microactuator 118 may be positioned anywhere on actuator assembly 112. For example, the microactuator 118 may be positioned between the suspension 114 and the read/write head 116. In certain embodiments, the suspension 114 is separated into multiple sections and the microactuator 118 may be positioned between the multiple sections. Moreover, the actuator assembly 112 may include multiple sets of microactuators. For example, the hard drive 100 may utilize a dual- or triple-stage actuation system, which may refer to a number of actuation systems (e.g., voice coil motor assembly, microactuators) used by the hard drive 100 to position the read/write heads 116.

During operation, hard drives may experience internal disturbances and/or be subject to external disturbances that affect hard drive performance and can cause data reading and writing errors. External disturbances can include, for example, vibration in a computer chassis caused by acoustic signals generated by speakers coupled to the computer chassis. Internal disturbances can include one or more of the read/write heads 116 contacting the magnetic recording medium 106 or a particle and inducing vibration within the actuator assembly 112.

These disturbances may cause the actuator assembly 112 to vibrate to such an extent that the actuator assembly 112 is unable to accurately maintain a desired position over the magnetic recording disks 106. For example, the read/write heads 116 may be reading data from or writing data to a desired track on one of the magnetic recording disks 106 when the shock event occurs or while computer speakers play music. The disturbances may cause the actuator assembly 112 and the read/write heads 116 to move off the desired track (i.e., off-track). This results in writing or reading errors because the read/write heads 116 are knocked off-track—making it difficult for a positioning system (e.g., servo control system) to correct the position of the actuator assembly 112 before the read or write operation is completed. An off-track writing error may result in a hard error where the read/write heads 116 write data to an unknown track, which may overwrite already-written data. An off-track reading error may result in an operation called a read retry where the hard drive 100 attempts to re-read the desired data, which can affect performance of a computer using the hard drive 100.

To detect and compensate for the above-mentioned disturbances, hard drives can be provisioned with one or more vibration sensors. However, vibration sensors can be relatively expensive and can use up (or not fit into) available real estate on a circuit board or flex circuit. The present disclosure is accordingly directed to disturbance compensation approaches for use in servo control systems without requiring use of a vibration sensor. In particular, the present disclosure contemplates utilizing a disk locked clock (DLC) error signal in various disturbance compensation approaches. Although the present disclosure discusses disturbance compensation without use of a vibration sensor, it is appreciated that one or more vibration sensors could be used in addition to or in combination with the approaches of the present disclosure.

FIG. 3A provides a schematic representation of a magnetic recording disk 106. The disk 106 includes circular tracks, such as track 302, which have regions for storing user data and positioning data. Lines 303a, 303b in FIG. 3A depict a portion (in FIG. 3A, a wedge) of the track 302. Information stored in that portion is represented in FIG. 3B. Specifically, the wedge includes user data regions 304 for storing user data and positioning regions 306 located between the user data regions 304 for storing positioning data. Each track of the magnetic recording disk 106 includes several positioning regions 306 (also called servo wedges) embedded between user data regions 304.

The positioning region 306 includes a preamble 308 and servo address mark (SAM) region 310. Although not shown in FIG. 3B, the positioning region 306 can also include a servo address (also referred to as track ID), position burst fields, and one or more repeatable runout (RRO) fields. The preamble 308 includes a known magnetic pattern that is read back as a signal. The SAM region 310 also includes a known pattern of bits that are read following the preamble 308. Together, the preamble 308 and SAM region 310 allow a hard drive's read/write channel to positively determine that the beginning of the positioning region 306 (e.g., a servo wedge) has been detected, and facilitates synchronizing a servo signal to read subsequent positioning data. The track ID includes a pattern (e.g., Gray code) that identifies the track in which the positioning region 306 is located. The position burst fields (sometime referred to as servo fields, servo burst fields and/or servo marks) are used to determine a fractional position. For example, the position burst fields facilitate fine alignment of the read/write head 116 on a track. The RRO fields also facilitate proper alignment of the read/write heads 116 on a track by correcting for known runout errors.

One exemplary use of positioning data, in particular, data stored in the SAM region 310, is to estimate and correct frequency error of the hard drive's sampling clock. The frequency error is estimated by a disk locked clock (DLC) system (see 450 in FIG. 4). In some embodiments, the DLC system uses a counter to measure timing between the SAM regions 310 in consecutive servo wedges to estimate the frequency error. Frequency error is typically used to correct or adjust the phase and frequency of a DLC synthesizer so that the synthesizer tracks preamble frequency changes due to variations in the rotational speed of the magnetic recording disk 106—thereby "phase locking" the servo pattern to the rotational speed of the magnetic recording disk 106.

The inventors of the present application have found that content of the DLC system's frequency error correlates to content of an uncompensated position error signal (PES), particularly in a down-track direction. In other words, DLC error can be used as an approximation of PES resulting from a disturbance. Because of the correlation between DLC error and uncompensated PES, DLC error can be used in place of using a physical vibration sensor, which is typically used to detect disturbances within a hard drive and to generate disturbance signals that assist in compensating for PES.

Figure 4:
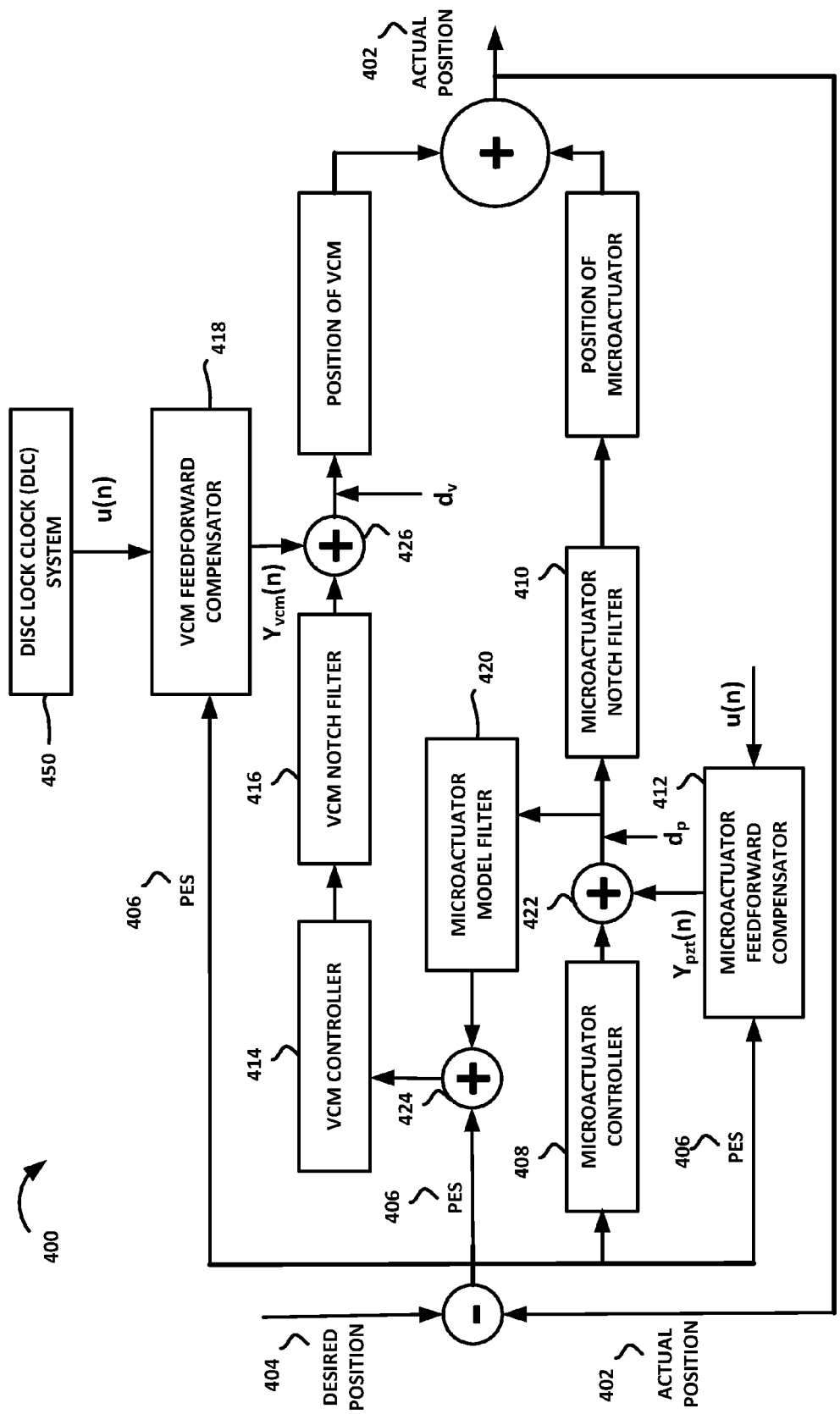
FIG. 4 shows a diagram of a servo control system, in accordance with certain embodiments of the present disclosure.

FIG. 4 provides a high-level representation of a servo control system 400 that utilizes DLC error from a DLC system 450 to correct for disturbances. The servo control system 400 is just one example of servo control systems that can utilize DLC error in this manner. In operation, a read/write head 116 reads servo data (e.g., positioning data) embedded on a magnetic recording disk 106 to determine an actual position 402 of the read/write head 116 relative to tracks on the magnetic recording disk 106. The actual position 402 of the read/write head 116 is subtracted from a desired position 404 of the read/write head 116 to determine a position error signal (PES) 406, which is the difference between where the read/write head 116 is and should be positioned.

Generally, the PES 406 is used to adjust a position of a read/write head 116 with respect to tracks on the magnetic recording disk 106 such that the read/write head 116 is positioned over the desired track. For example, the PES 406 is inputted to a voice coil motor (VCM) controller 414, which assists with controlling current applied to the voice coil 124 for rotating the actuator control assembly 112. The PES 406 is also inputted to a microactuator controller 408, which assists with controlling voltage applied to the microactuator 118 (e.g., PZT elements) for pivoting the read/write head 116.

As described above, the DLC system 450 measures timing between SAM regions in consecutive servo wedges on a magnetic recording disk to estimate a DLC error (e.g., frequency error) and generate a DLC error signal, which is indicative of the DLC error and is designated as u(n) in FIG. 4.

The servo control system 400 includes a microactuator controller 408, microactuator notch filter 410, microactuator feedforward compensator 412, VCM controller 414, VCM notch filter 416, and VCM feedforward compensator 418. In addition to utilizing DLC error to correct for disturbances, the servo control system 400 of the present disclosure is designed to decouple components of the microactuator control loop from components of the voice coil motor (VCM) control loop. As will be shown by Equations 1-9 below, the servo control system 400 can be configured such that microactuator controller 408 can be designed separately from the VCM controller 414. This is useful because aspects of the servo control system 400—such as filter parameters for particular disturbances and frequencies—can be tuned for effective compensation of disturbances experienced by the actuator assembly 112 and estimated by DLC error. In particular, the microactuator controller 408, microactuator notch filter 410, microactuator feedforward compensator 412 can be designed to compensate for higher frequency disturbance components while the VCM controller 414, VCM notch filter 416, and VCM feedforward compensator 418 can be designed to compensate for lower frequency disturbance components.

During operation of the hard drive 100, the PES 406 is used to adjust a position of the read/write head 116 with respect to tracks on the magnetic recording disk 106 such that the read/write head 116 is positioned over the desired track. For example, the PES 406 is injected into the VCM controller 414, which generates a VCM control signal that assists with controlling current applied to the voice coil 134 for rotating the actuator assembly 112. The PES 406 is also injected into the microactuator controller 408, which generates a microactuator control signal that assists with controlling voltage applied to the microactuator 118 (e.g., PZT elements) for pivoting the read/write head 116.

VCM and microactuator compensation signals, $Y_{pzt}(n)$ and $Y_{vcm}(n)$, are generated in response to the PES 406 and DLC error signal(s), u(n), using the microactuator feedforward compensator 412 and VCM feedforward compensator 418, respectively. The compensation signals are applied to the respective VCM and microactuator stages of the servo control system 400 to compensate for disturbances. As shown in FIG. 4, the microactuator compensation signal, $Y_{pzt}(n)$, generated by the microactuator feedforward compensator 412 is injected at summing node 422—positioned after the microactuator controller 408 but before the microactuator notch filter 410—to generate a modified microactuator control signal. The modified microactuator control signal is filtered by the microactuator notch filter 410. The filtered modified microactuator control signal controls voltage applied to the microactuator 118 for pivoting the read/write head 116.

The modified microactuator control signal is also used by the microactuator model feedback filter 420, which can take the form of a low-order filter that represents the position of the microactuator. The microactuator model feedback filter 420 is designed to offset an estimated microactuator position from PES inputted to the VCM controller 414. The microactuator model feedback filter 420 filters the modified microactuator control signal after which the filtered modified microactuator control signal is added to from the PES 406 at junction 424 to generate a modified PES. The modified PES is modified such that the effect of the microactuator position is removed. In other words, the modified PES is the estimated residual PES after accounting for the microactuator positioning. The modified PES is injected into the VCM controller 408. As such, the VCM controller 414, VCM notch filter 416, and VCM feedforward compensator 418 can be designed to focus on disturbance components better suited to be compensated for by the VCM. The VCM compensation signal, $Y_{VCM}(n)$, generated by the VCM feedforward compensator 418 is injected at summing node 426, which is positioned after both the VCM controller 414 and VCM notch filter 416 and which generates a final VCM control signal that controls current to the voice coil 134 of the voice coil motor assembly 120 to rotate the actuator assembly 112.

The compensation signals can be tailored to the response characteristics of the VCM and microactuator portions of the servo control system 400. For example, higher frequency disturbance compensation may be applied to the microactuator because the microactuator is better able to compensate such higher frequency disturbance components. Lower frequency disturbance compensation may be applied to the VCM because the VCM is better able to compensate such lower frequency disturbance components.

Figure 5:
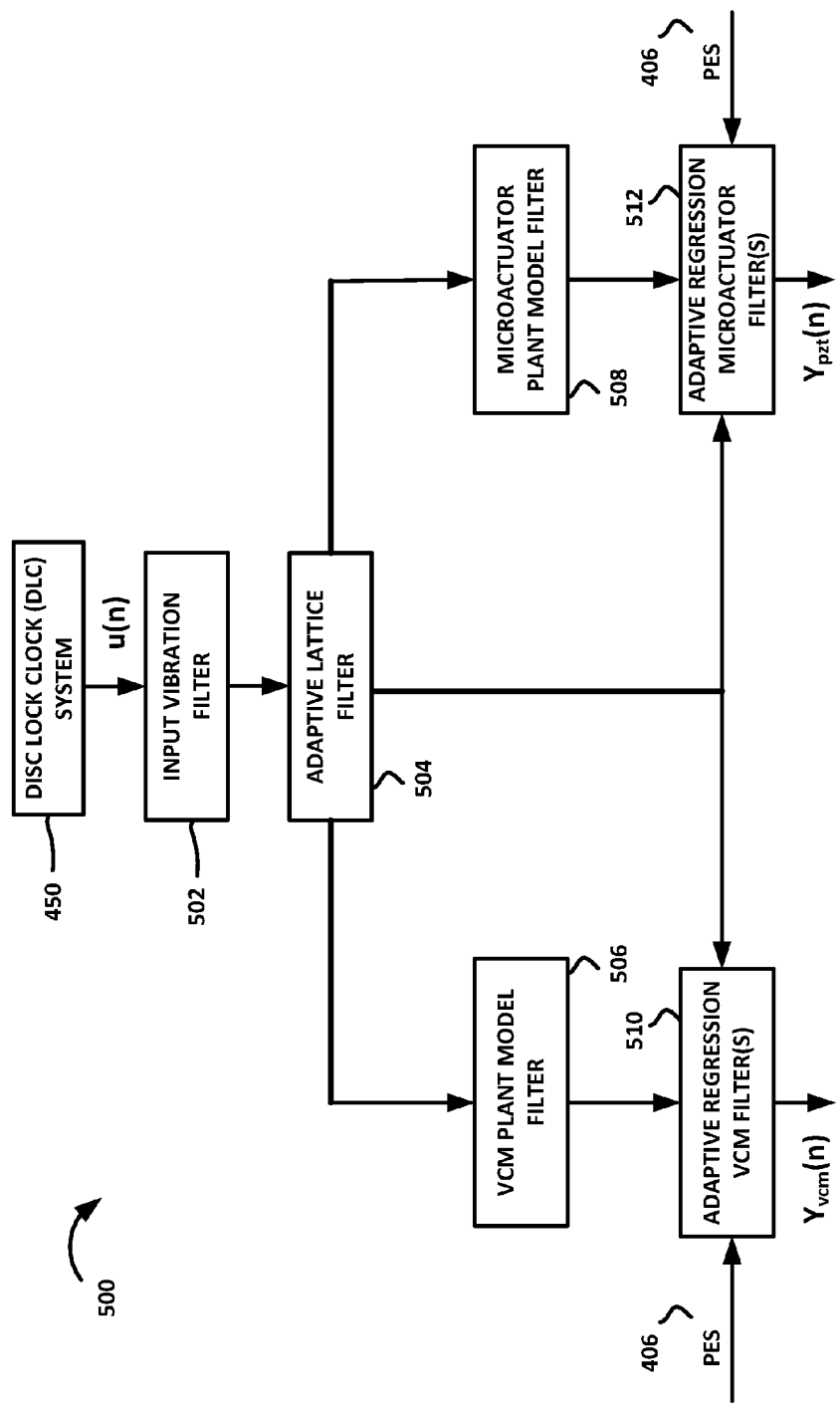
FIG. 5 shows a diagram of a portion of the servo control system shown in FIG. 4.

FIG. 5 provides additional detail on both the microactuator feedforward compensator 412 and VCM feedforward compensator 418, which together form a compensation circuit 500. The compensation circuit 500 performs multi-stage least mean squares (LMS) adaptive filtering to generate the VCM and microactuator compensation signals, $Y_{vcm}(n)$ and $Y_{pzt}(n)$. The compensation circuit utilizes an optional input filter 502, an adaptive lattice filter 504, VCM plant model 506, microactuator plant model 508, adaptive regression VCM filter 510, and adaptive regression microactuator filter 512.

In some embodiments, the input filter 502 normalizes the phase of the DLC error signal u(n) and removes certain undesired disturbances or disturbance components from the DLC error signal, u(n). The input filter 502 outputs a forward prediction error signal and a backward prediction error signal to a first stage of the N number of stages of the adaptive lattice filter 504. The outputs from the adaptive lattice filter 504 are tap inputs to each of the various stages of the VCM and microactuator regression filters 510, 512. The VCM and microactuator regression filters 510, 512 have N number of lattice regression filter stages corresponding to the N number of lattice filter stages of the adaptive lattice filter 504.

For each lattice filter stage and corresponding lattice regression filter stage, the backward prediction error signal passes through a VCM plant model filter 506 and microactuator plant model filter 508 to adapt coefficients of the VCM and microactuator regression filters 510, 512 jointly with the PES 406. The VCM plant model filter 506 and the microactuator plant model filter 508 function to maintain LMS adaption stability of the servo control system 400.

The VCM and microactuator regression filters 510, 512 are connected to various taps of the adaptive lattice filter 504 to receive orthogonal prediction error signals from each stage. Each successive stage outputs a new set of orthogonal error signals. The signals may be processed through the adaptive lattice filter 504 in accordance with the so-called Gram-Schmidt Orthogonalization procedure whereby the adaptive lattice filter 504 uses reflection coefficients to split the input signal into N sets of orthogonal signals.

Each stage of the VCM and microactuator regression filters 510, 512 receives a separate one of the backward prediction error signals, and applies a regression step to generate respective lattice stage error signals and compensation signals, $Y_{vcm}(n)$ and $Y_{pzt}(n)$. Nominally, the final error signal is driven to zero or a nominal value and the final correction signals, $Y_{vcm}(n)$ and $Y_{pzt}(n)$, are output for injection into VCM or microactuator control signals where the VCM regression filter 510 is injected after the VCM notch filter 416 and the microactuator regression filter 512 is injected before the microactuator notch filter 410.

The Equations presented below describe operation of the servo control system 400. In particular, Equation 9 shows that the microactuator plant model 508 can be described by microactuator components independent from and/or without VCM components. As such, the VCM plant model 506 and microactuator plant model 508 can be designed independently to compensate for certain disturbance components.

$P_v$=VCM plant without notch filter
$P_p$=microactuator plant without notch filter
$N_v$=VCM notch filter
$N_p$=microactuator notch filter
$C_v$=VCM controller
$C_p$=microactuator controller
$d_v$=equivalent input disturbance at VCM input
$d_p$=equivalent input disturbance at microactuator input
OL=overall open loop transfer function
$OL_p$=microactuator open loop function
e=PES Equation 1, showing components of a signal transfer function from $d_v$, $d_p$ to PES:

$$e = -\frac{P_v}{1+OL} \times d_v - \frac{N_p P_p (1 + P_v N_v C_v)}{1+OL} \times d_p$$

Equation 2, showing components of the overall open loop transfer function of the servo control system 400:

$$OL = P_p N_p C_p + P_p N_p C_p P_v N_v C_v + P_v N_v C_v$$

Equation 3, showing components of the decoupled microactuator open loop transfer function of the servo control system 400:

$$OL_p = 1 + P_p N_p C_p$$

$$1+OL=(1+P_p N_p C_p) \times (1+P_v N_v C_v) \quad \text{Equation 4:}$$

Equation 5, where Equation 4 is substituted into Equation 1:

$$e = -\frac{P_v}{1+OL} \times d_v - \frac{N_p P_p (1 + P_v N_v C_v)}{(1 + P_p N_p C_p) \times (1 + P_v N_v C_v)} \times d_p$$

Equation 6, which is a simplification of Equation 5:

$$= -\frac{P_v}{1+OL} \times d_v - \frac{N_p P_p}{1 + P_p N_p C_p} \times d_p$$

Equation 7, which is a simplification of Equation 6:

$$= -\frac{P_v}{1+OL} \times d_v - \frac{N_p P_p}{1 + OL_p} \times d_p$$

Equation 8, representing components of the VCM plant model 506:

$$-\frac{P_v}{1+OL}$$

Equation 9, representing components of the microactuator plant model 508:

$$-\frac{N_p P_p}{1+OL_p}$$

The various embodiments and components described above may be implemented using firmware, integrated circuits, and/or software modules that interact with each other or are combined together. For example, the control diagrams illustrated herein may be used to create computer-readable instructions/code for execution by a processor. Such instructions may be stored on a non-transitory computer-readable medium and transferred to a processor for execution. In another example, the embodiments and components described above, such as components of the servo control system 400, are implemented in one or more application-specific integrated circuits (ASIC). The structures and procedures shown above are only a representative example of embodiments that can be used to provide the functions described hereinabove.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:
1. An apparatus comprising:
a disk locked clock system configured to estimate a timing error and generate a timing error signal indicative of the estimated timing error;
a feedforward microactuator compensator configured to generate a microactuator compensation signal in response to the timing error signal;
a feedforward voice coil motor (VCM) compensator configured to generate a VCM compensation signal in response to the timing error, and
wherein the feedforward microactuator compensator is configured to generate the microactuator compensation signal without use of a vibration sensor signal.
2. The apparatus of claim 1,
wherein the feedforward VCM compensator is configured to generate the VCM compensation signal without use of a vibration sensor signal.
3. The apparatus of claim 1, further comprising:
a microactuator controller configured to generate a microactuator control signal,
wherein the microactuator compensation signal is configured to be injected into the microactuator control signal to generate a modified microactuator control signal.
4. The apparatus of claim 3, further comprising:
a microactuator model filter configured to filter the modified microactuator control signal to generate a filtered modified microactuator control signal and inject the filtered modified microactuator control signal into a position error signal to generate a modified position error signal.

5. The apparatus of claim 4, further comprising:
a voice coil motor (VCM) controller, wherein the modified position error signal is injected into the VCM controller.

6. The apparatus of claim 5, wherein the VCM controller is configured to generate a VCM control signal in response to the modified position error signal.

7. The apparatus of claim 6, further comprising:
a VCM notch filter configured to generate a filtered VCM control signal.

8. The apparatus of claim 7, wherein the VCM compensation signal is injected into the filtered VCM control signal to generate a final VCM control signal.

9. The apparatus of claim 8, wherein the final VCM control signal controls a current applied to a voice coil.

10. The apparatus of claim 4, further comprising:
a microactuator notch filter configured to filter the modified microactuator control to generate a filtered modified microactuator control signal that controls a voltage applied to the microactuator.

11. The apparatus of claim 1, wherein the feedforward microactuator compensator is configured to generate the microactuator compensation signal in response to the position error signal and the timing error signal.

12. The apparatus of claim 1, wherein the disk locked clock system is configured to estimate a timing error by measuring time between servo address marks.

13. An apparatus comprising:
a disk locked clock system configured to estimate a timing error and generate a timing error signal indicative of the estimated timing error;
a feedforward voice coil motor (VCM) compensator configured to generate a VCM compensation signal in response to the timing error signal, wherein the VCM compensator is configured to generate the VCM compensation signal without use of a vibration sensor signal; and
a VCM notch filter configured to generate a filtered VCM control signal, wherein the VCM compensation signal is injected into the filtered VCM control signal to generate a final VCM control signal.

14. The apparatus of claim 13, wherein the VCM compensator is configured to generate the VCM compensation signal in response to the position error signal and the timing error signal.

15. The apparatus of claim 13, wherein the disk locked clock system is configured to estimate a timing error by measuring time between servo address marks.

16. The apparatus of claim 13, wherein the final VCM control signal controls a current applied to a voice coil.

17. The apparatus of claim 13, further comprising:
a VCM controller configured to generate a VCM control signal, wherein the VCM notch filter is configured to generate the filtered VCM control signal in response to the VCM control signal.

18. The apparatus of claim 13, further comprising:
a feedforward microactuator compensator configured to generate a microactuator compensation signal in response to the timing error signal.

19. The apparatus of claim 18, further comprising:
a microactuator controller configured to generate a microactuator control signal, wherein the microactuator compensation signal is configured to be injected into the microactuator control signal to generate a modified microactuator control signal.

20. The apparatus of claim 19, further comprising:
a microactuator notch filter configured to generate a filtered microactuator control signal in response to the modified microactuator control signal, wherein the filtered microactuator control signal is configured to control voltage applied to a microactuator.

* * * * *